ized Patent [19]

United States Patent [19]
Sorensen

[11] Patent Number: 4,657,141
[45] Date of Patent: Apr. 14, 1987

[54] HOLLOW STACKABLE PLASTIC PRODUCTS

[75] Inventor: Jens O. Sorensen, Rancho Santa Fe, Calif.

[73] Assignee: Primtec, Rancho Santa Fe, Calif.

[21] Appl. No.: 820,874

[22] Filed: Jan. 16, 1986

Related U.S. Application Data

[60] Continuation of Ser. No. 643,844, Aug. 23, 1984, abandoned, which is a division of Ser. No. 424,493, Sep. 27, 1982, Pat. No. 4,467,994.

[51] Int. Cl.$^4$ .............................................. B65D 1/42
[52] U.S. Cl. ...................................... 206/519; 220/72; 229/1.5 B; D9/350
[58] Field of Search .................... 249/142, 144, 151; 264/328.12; 425/542, 577; 206/519, 520; 220/72; 229/1.5 B; D9/350

[56] References Cited

U.S. PATENT DOCUMENTS

| | | | |
|---|---|---|---|
| 2,434,594 | 1/1948 | Schultz | 249/142 |
| 2,859,557 | 11/1958 | Lattuca | 220/72 |
| 3,157,335 | 11/1964 | Maier | 220/72 |
| 3,372,830 | 3/1968 | Edwards | 206/519 |
| 3,375,554 | 4/1968 | Blumer | 249/142 |
| 3,397,266 | 8/1968 | Ayres | 264/328 |
| 3,995,008 | 11/1976 | Spiegelberg | 249/109 |
| 4,082,184 | 4/1978 | Hammer | 206/519 |
| 4,165,062 | 8/1979 | Mitchell | 249/142 |
| 4,175,661 | 11/1979 | Barnes | 206/519 |
| 4,264,295 | 4/1981 | Hingley | 425/577 |
| 4,359,160 | 11/1982 | Myers et al. | 229/1.5 B |
| 4,420,081 | 12/1983 | Dart | 229/1.5 B |
| 4,467,994 | 8/1984 | Sorensen | 249/144 |

FOREIGN PATENT DOCUMENTS

| | | |
|---|---|---|
| 17577 | 1/1972 | Australia . |
| 655830 | 11/1964 | Belgium ............................. 229/1.5 B |
| 962726 | 6/1950 | France . |

OTHER PUBLICATIONS

Kunststoffe, vol. 51, No. 10, 1961, München, H. Gastrow, "Spritzgusswerkzeug für Tablettenröhrchen".

*Primary Examiner*—Jay H. Woo
*Assistant Examiner*—James C. Housel
*Attorney, Agent, or Firm*—Edward W. Callan

[57] ABSTRACT

A molded thin-walled hollow, stackable plastic product, having an open top, a closed bottom and side walls; wherein the side walls include a series of circumferential sections joined by circumferential strips, with the upper of two adjacent wall sections having a greater diameter than the lower adjacent wall section to thereby define a circumferential ridge at the bottom of each upper wall section. The circumferential strip joining a pair of the wall sections is a circumferential isthmus having an isthmus distance, which is the minimum distance between the mold parts defining the isthmus, that is significantly shorter than the predominant thickness of the adjacent wall sections. The isthmuses, which are aligned at an acute angle with respect to each of the joined wall sections, improve the rigidity of the molded thin-walled hollow product. The wall sections include a plurality of spaced protruding ridges extending between adjacent circumferential strips. When the molded product is a hand-held vending cup the combination of the circumferential ridges and the spaced protruding ridges prevent burning of the fingers.

7 Claims, 7 Drawing Figures

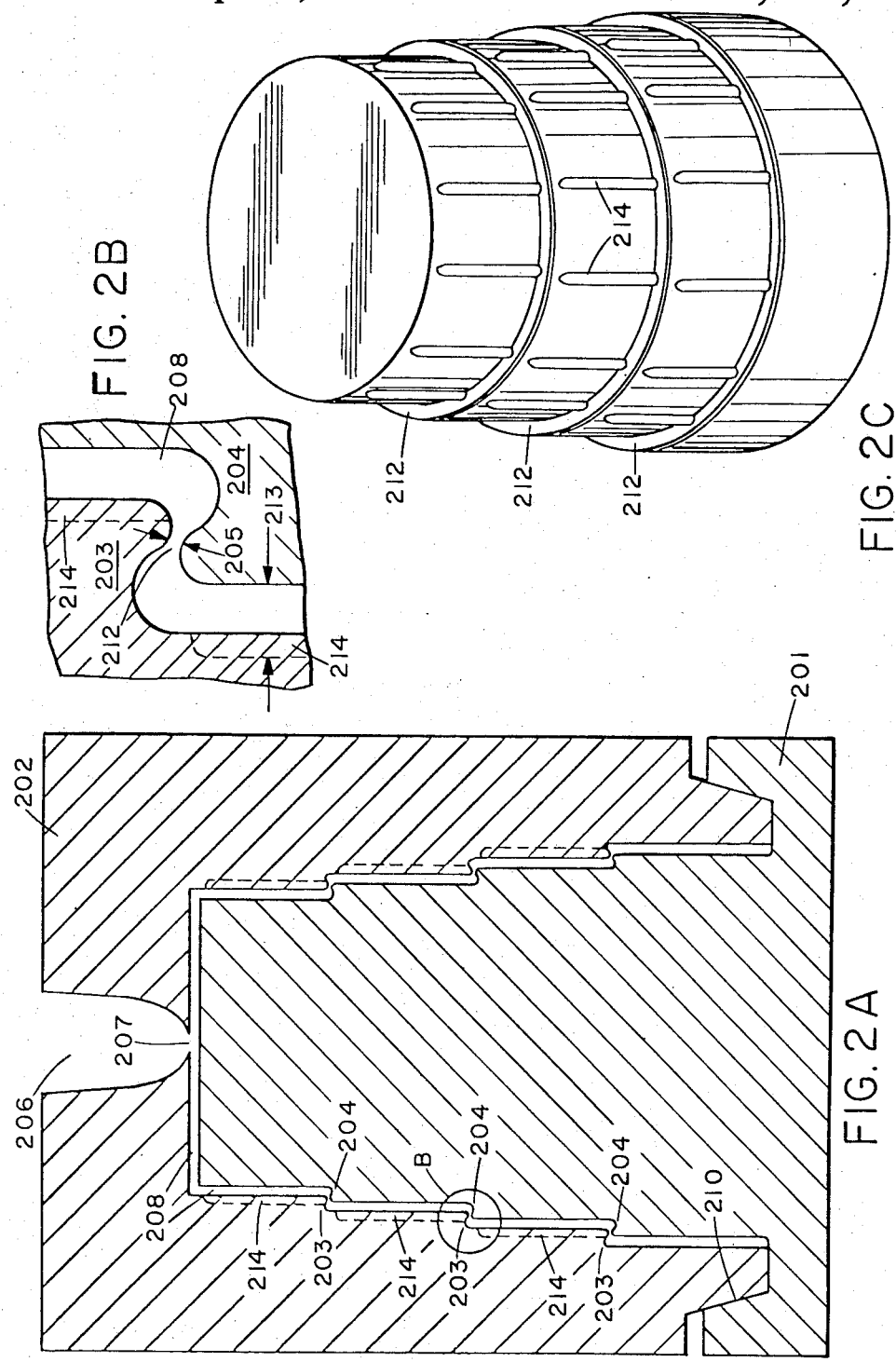

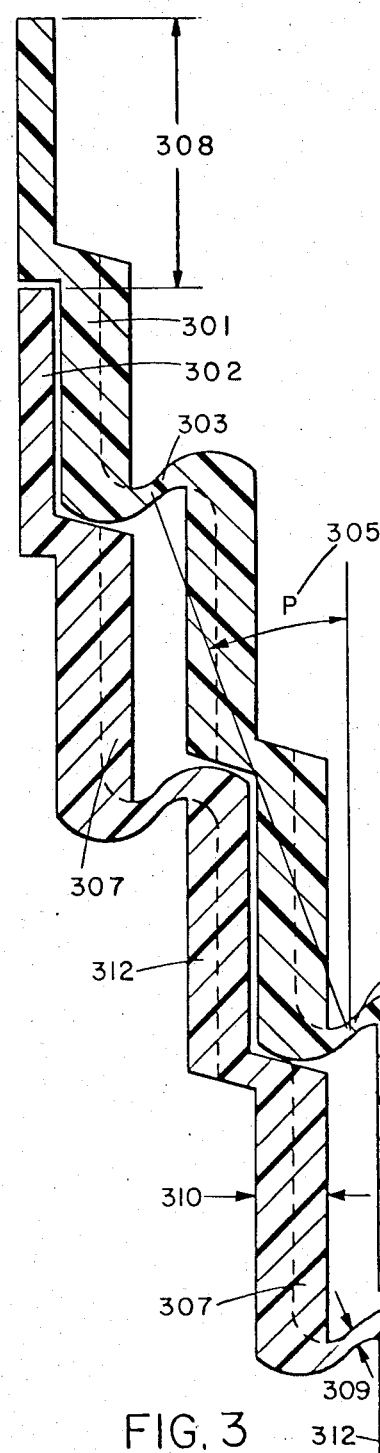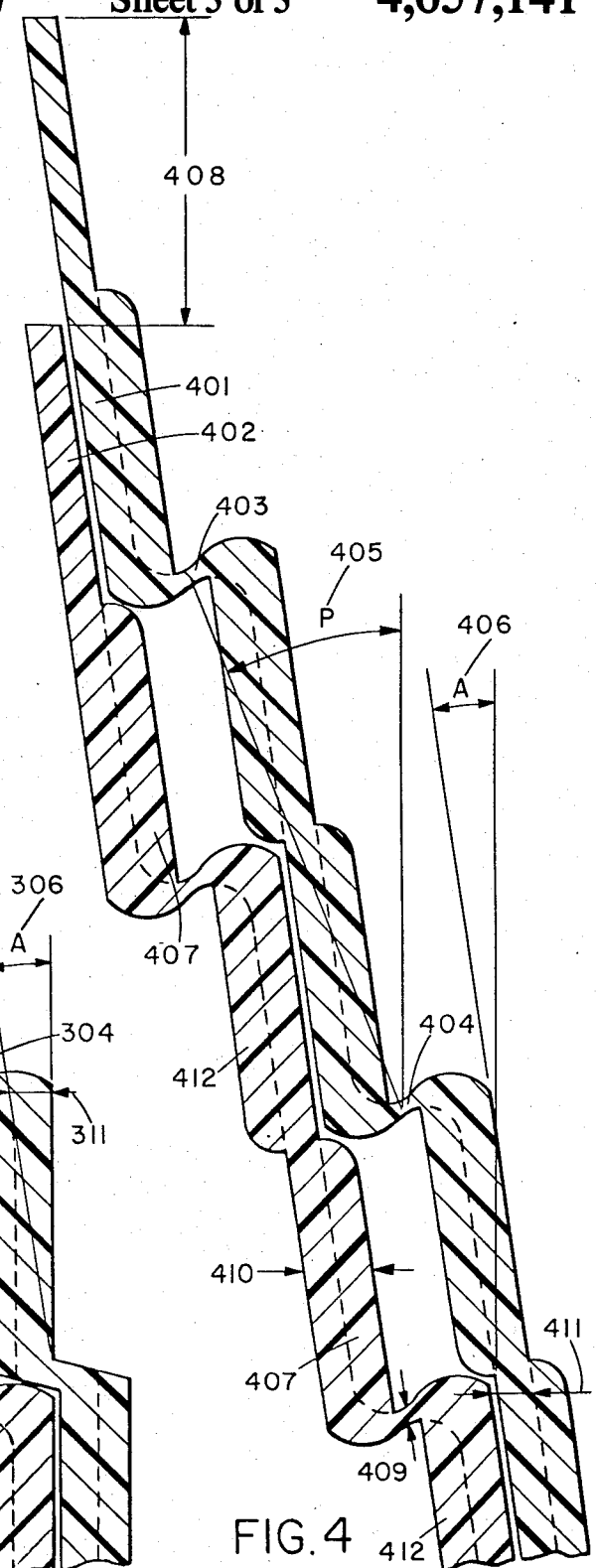
FIG. 3
FIG. 4

HOLLOW STACKABLE PLASTIC PRODUCTS

This is a continuation of co-pending application Ser. No. 643,844 filed on Aug. 23, 1984, now abandoned which is a div. of Ser. No. 424,493 filed Sept. 27, 1982 now U.S. Pat. No. 4,467,994

FIELD OF INVENTION

This invention generally relates to hollow stackable plastic products produced by injection molding and is particularly directed to products produced by centering the core of the mold. The core is the mold part which forms the interior of a concave or hollow molded product.

CROSS REFERENCE TO RELATED APPLICATION

The invention is cross referenced to U.S. patent application Ser. No. 230,302, now U.S. Pat. No. 4,381,275 entitled STABILIZED CORE INJECTION MOLDING OF PLASTIC and United Kingdom Patent Application No. 8,221,909 entitled STABILIZED CORE INJECTION MOLDING, both applications which are different are by the inventor of the present application.

DISCUSSION OF PRIOR ART

Heretofore, it has been a great problem to center the cores of molds used for injection molding of hollow stackable products of plastic with thin walls such as vending cups, yogurt containers, margarine containers and flower pots. In order to injection mold such products a very large injection pressure is necessary which causes the core part of the mold to move in relation to the cavity part of the mold, resulting in molded products which do not have even wall thickness.

Until now no practical solution has been found to the problem and therefore such products are generally produced with a wall thickness which is larger than necessary for the purposes of the product. With the larger wall thickness lower injection pressure is sufficient for filling the mold, and therefore less strain is put on the core part of the mold, with resulting more evenly distributed wall thickness.

Many unsuccessful attempts have been made to solve the problem of core centering, for example U.S. Pat. No. 4,264,245 to Hingley; and U.S. Pat. No. 3,375,554 to Blumer, which is the closest prior art to the present invention, a description of the mold disclosed by Blumer and the reason that it is not successful is illustrated in the drawings and their description.

SUMMARY OF THE INVENTION

The present invention is a thin-walled, hollow, stackable plastic product produced by injection molding with a mold, comprising a core part and a cavity part, where the relative reciprocal wall thickness of the molded product may be equalized by centering the core part in the cavity part during injection.

The core part and the cavity part each have an axially extending circumferential recess in a circumferential shoulder. Each such recess limits an axially extending annular projection (ridge). Corresponding such annular projections located on the sides of the core part and the cavity part respectively in combination define a core-centering circumferential throttle. The minimum distance from the ridge of the core part to the corresponding ridge of the cavity part is called the throttle distance, when the core part is centered in the cavity part the throttle distance of the invention is significantly shorter than the adjacent wall thickness. The circumferential throttle defines a circumferential strip in the form of a circumferential isthmus in the molded product, whereby the throttle distance corresponds to an isthmus distance in the molded product.

The molded thin-walled hollow, stackable plastic product of the present invention has an open top, a closed bottom and side walls; wherein the side walls include a series of circumferential sections joined by circumferential strips, with the upper of two adjacent wall sections having a greater diameter than the lower adjacent wall section to thereby define a circumferential ridge at the bottom of each upper wall section. The circumferential strip joining a pair of the wall sections is a circumferential isthmus having an isthmus distance, which is the minimum distance between the mold parts defining the isthmus, that is significantly shorter than the predominant thickness of the adjacent wall sections. The isthmuses, which are aligned at an acute angle with respect to each of the joined wall sections, improve the rigidity of the molded thin-walled hollow product. The wall sections include a plurality of spaced protruding ridges extending between adjacent circumferential strips. When the molded product is a hand-held vending cup the combination of the circumferential ridges and the spaced protruding ridges prevent burning of the fingers. For purposes of stacking the molded hollow products the angle of the pitch between the adjacent circumferential ridges is larger than are tangent of the predominant adjacent section wall thickness divided by the distance between the adjacent horizontal ridges. The circumferential ridges on the side of the core and cavity part of the mold shape the circumferential isthmuses on the hollow stackable molded product. Each circumferential isthmus is aligned at an acute angle with respect to each of the wall sections joined by the isthmus. These isthmuses help to make the hollow product rigid. When the hollow product is, for example, a hand-held vending cup for hot drinks, the combination of the spaced protruding ridges and the circumferential ridges provide a reduced area of contact between cup and fingers, resulting in less heat transfer and prevent possible burning of the fingers. There may conveniently be about ten to twenty circumferential strips on the molded product, not all of these ridges need to be isthmuses with an isthmus distance which is significantly shorter than the predominant adjacent wall thickness. In one embodiment only every other circumferential strip is a circumferential isthmus. The circumferential isthmuses which are nearer the bottom of the hollow product have shorter isthmus distances than the isthmuses which are closer to the open end of the hollow product.

In order to ease the filling of the cavity for injection molding of the thin-walled hollow product, a number of feed channels may be provided in the core and/or cavity part of the mold leading in a direction from the apex towards the open end of the hollow product. In order to get the best core centering, it is important that the throttle distance, particularly of the throttles near the apex end of the hollow product, is small in relation to the adjacent wall thickness where molten plastic is flowing during the filling. During the filling step, a large proportion of the injected plastic will flow in the above mentioned feed channels, and therefore the throttle distance in relation to the wall thickness of the feed channels is particularly small, thereby greatly improving the core centering process. The feed channels define the protruding spaced ridges in the molded thin-walled product.

Further objects and advantages of the invention will become apparent from a consideration of the drawings and subsequent description thereof.

BRIEF DESCRIPTION OF THE DRAWINGS

FIG. 2A illustrates a sectional view of a mold according to a preferred embodiment of the invention.

FIG. 2B illustrates an enlarged sectional view of a throttle located in the circled area marked B of FIG. 2A.

FIG. 2C illustrates a perspective view of a hollow stackable plastic product as produced in the mold of FIG. 2A.

FIG. 3 shows a partial sectional view of two hollow stackable plastic products in their stacked position as produced by a mold of a preferred embodiment of the invention.

FIG. 4 shows a partial sectional view of two hollow stackable plastic products in their stacked position as produced by a mold of another preferred embodiment of the invention.

DESCRIPTION OF THE ILLUSTRATED PRIOR ART

Figure 1B:
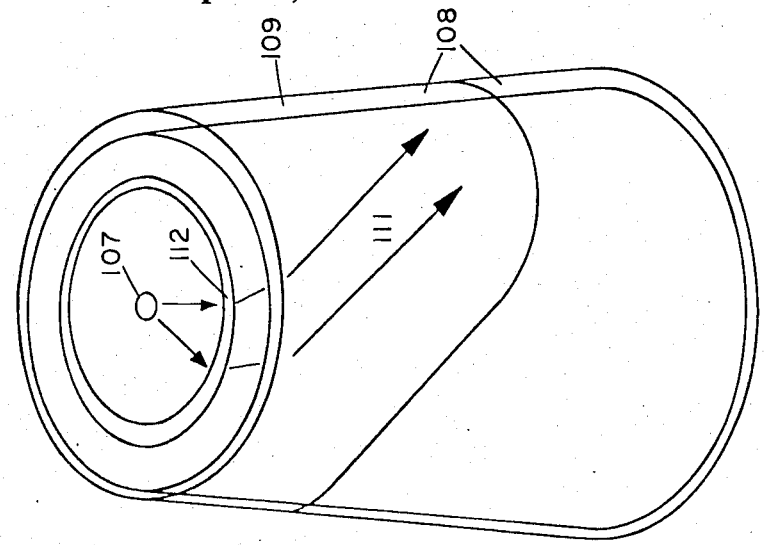
FIG. 1B illustrates a perspective view of the cavity part of the mold of FIG. 1A.
Figure 1A:
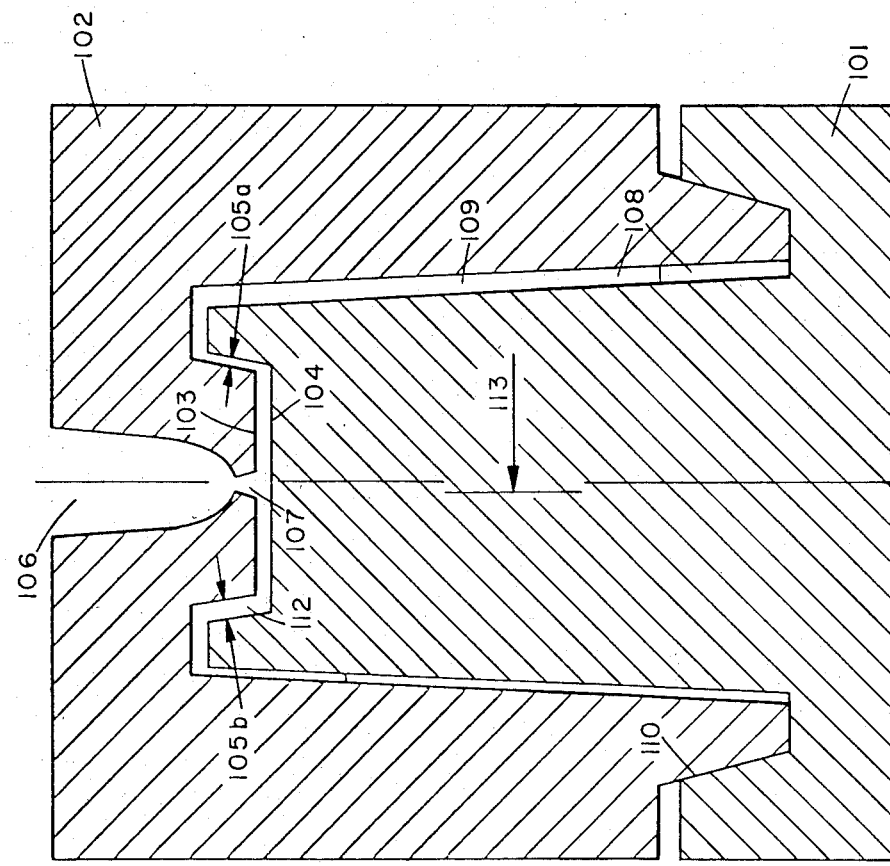
FIG. 1A illustrates a sectional view of a prior art mold for injection molding of hollow stackable plastic products.

FIG. 1A shows a prior art mold comprising a core part 101 and a cavity part 102 for injection molding a thin-walled, hollow, stackable plastic product. The cavity part 102 comprises a circumferential protuberance 103 which projects into a circumferential depression 104 of the apex of the core part 101. The protuberance 103 and the depression 104 in combination provide a circumferential throttle 112 with a throttle distance 105a and 105b which at an average corresponds to the wall thickness of the molded product to be produced. The mold 101, 102 comprises a runner 106 and a gate 107 which connects the runner 106 with the cavity 108. A partly filled product 109 is shown in the cavity 108. Near the open end of the cavity part 102 is a conical flange 110 which centers the core part 101 with the cavity part 102 of the mold when the mold is closed, and before plastic is injected.

FIG. 1B shows a perspective view of the cavity 108.

The operation of the prior art embodiment depicted in FIGS. 1A and 1B is as follows: molten plastic enters from the runner 106 through the gate 107 into the cavity 108. The molten plastic will from practical experience flow further down the side of the core than the other, in this case the side down which the molten plastic has flown the furthest is depicted as the right side. The pressure of the molten plastic on the right side of the core part 101 causes a force on the core part 101 in a left going direction which is greater than the force in a right going direction caused by the pressure of the molten plastic on the left side of the core part 101, and therefore the core is forced to the left, as shown by the arrow 113. Both the forces and movement as described above are in relation to the cavity part 102. The two opposing forces are proportional to the product of the pressure and the projected area; both average pressure and area is greater on the right side of the core part 101, and therefore the force is also greater on the right side of the core. In the absence of the circumferential throttle 112, most of the molten plastic would continue to flow down the right side of the cavity 108, thereby further moving the core part 101 to the left, in a vicious circle of off-centering the core part 101 in the cavity part 102 of the mold. But in the case depicted in FIG. 1A, the action of the core part 101 moving to the left will cause the right side of the circumferential throttle 112 to close up and the left side of the throttle 112 to open up, resulting in the flow down the right side of the cavity 108 being impeded and the flow down the left side of the cavity 108 being enhanced, thereby to a certain extent breaking the vicious circle. Unfortunately, practical experience shows that the above described prior art system is unsuccessful. The reason will become apparent from a description of the operation of the perspective view of the cavity in FIG. 1B. The flow of molten plastic to the right and to the left has already been described; we shall not look at the flow of molten plastic which flows in a direction towards the observer.

The molten plastic flows from the gate 107 to the circumferential throttle 112. At the right the throttle 112 is quite closed up and at the left the throttle 112 is quite opened up, but in a direction towards the observer the throttle 112 is at a wall thickness which corresponds to that of the molded product to be produced. The molten plastic therefore flows through the throttle 112 and continues in the direction of greater cavity thickness. Down the left side of the cavity 108 the thickness is decreased due to the core part 101 moving to the left, down the front side of the cavity 108 the thickness is that of the product to be produced, but down the right side the cavity thickness is increased due to the core part 101 moving to the left; the molten plastic therefore moves down in a right direction as depicted by the arrows 111. Unfortunately, this flow bypasses the closed up side of the circumferential throttle 105B, and the advantages of the core centering process are very small indeed.

DESCRIPTION OF THE PREFERRED EMBODIMENTS

FIG. 2A shows a mold of a preferred embodiment of the invention. The mold comprises a core part 201 and a cavity part 202 for injection molding a thin-walled, hollow, stackable plastic product. The side of the cavity part 202 comprises several circumferential ridges 203 and the side of the core part 201 comprises an equal number of circumferential ridges 204. Each ridge 203 of the cavity part 202 corresponds to a ridge 204 of the core part 201. Each corresponding pair of circumferential ridges provides a self-centering circumferential throttle 212 for the injection of plastic. The minimum distance from the ridge of the core part 204 to the corresponding ridge of the cavity part is called the throttle distance 205, seen best on FIG. 2B; the throttle distance 205 is significantly shorter than the adjacent wall thickness 213. The mold 201, 202 also comprise a runner 206 and a gate 207 which connects the runner 206 with the cavity 208. Near the open end of the cavity part 218 is a conical flange 210 which centers the core part 201 with the cavity part 202 of the mold, when the mold is closed and before plastic is injected. FIG. 2C shows a molded product of the mold of FIG. 2A, in order to ease the filling of the cavity 208 a number of feed channels 214 are provided in the cavity part of the mold, leading in a direction from the apex towards the open end of the molded product.

The operation of the preferred embodiment depicted in FIGS. 2A, 2B and 2C is as follows: molten plastic enters from the runner 206 through the gate 207 into the cavity 208. The molten plastic will from practical experience flow further down one side of the core part 201 than the other, for example the right side, thereby forcing the core slightly to the left, thereby slightly closing the circumferential throttle 212 on the right side, and slightly opening the circumferential throttle 212 on the left side.

Since the throttle distance 205 is significantly shorter than the adjacent wall thickness 213, and since the circumferential throttle distance is shorter on the right side than on the left side of the cavity 208, the molten plastic will have a tendency to fill mainly the left side of the cavity 208. Although 100% core centering is not achieved at this stage, and the flow of molten plastic is still faster on the right side of the core 201 than the left side of the core 201, the flowing molten plastic will soon meet a new circumferential throttle 212 which is slightly more closed on the right side than the left side, so that the molten plastic will have an additional tendency to fill up mainly the left side of the cavity 208. The next circumferential throttle 212 will have the same tendency and so on until almost 100% core centering is achieved.

The four most important factors that the mold used in making the product of the invention is successful in relation to the prior art are: (a) that the throttle distance is significantly shorter than the adjacent wall thickness of the molded product, particularly in the circumferential throttles which are nearest to the gate 207; (b) that because of the feed channels 214, the relation of the throttle distance to the adjacent wall thickness is further decreased; (c) the distance from the gate to each circumferential throttle, which is positioned on the side of the core and cavity parts respectively, is greater than in the prior art, making shortcuts to the flow of the molten plastic more difficult; and (d) there are a number of circumferential throttles instead of only one.

FIG. 3 shows a partial sectional view of two thin-walled, hollow, stackable plastic products in their stacked position, molded by a mold of the invention of a slightly modified embodiment than that depicted in FIGS. 2A, 2B and 2C. Shown is an upper product 301 and a lower product 302 separated by the stacking height 308. Shown is also a first circumferential isthmus 303 and a second circumferential isthmus 304 of the upper product 301. The isthmus distance 309 which is the minimum distance from the ridge of the core part to the corresponding ridge of the cavity part, of the production mold of the product, is significantly shorter than the adjacent wall thickness 311. The angle of the pitch 305 from the predominant isthmus 303 to the second isthmus 304 is larger than arcus tangent 306 of the basic horizontally measured predominant wall thickness 311 between the isthmuses 303 and 304 divided by the stacking height 308 of the molded product.

Between the isthmuses are a number of protruding ridges 307. 312 spaced as shown in FIG. 2C and leading from isthmus to isthmus 304, 303, etc. A part of the spaced ridges 307 project towards the center axis of the molded product 301, 302 and another part of the spaced ridges 312 projects away from the center axis of the molded product 301, 302. The molded product 301, 302 and therefore also its production mold comprise a number of circumferential ridges which are separated by a distance which is equal to the stacking height 308 of the molded product 301, 302.

FIG. 4 shows a partial sectional view of two thin-walled, hollow, stackable plstic products in their stacked position molded by a mold of the invention of a slightly modified embodiment than that depicted in FIGS. 2 or 3. Shown is an upper product 401 and a lower product 402 separated by the stacking height 408. Shown is also a first circumferential isthmus 403 and a second circumferential isthmus 404 of the upper product 401. The isthmus distance 409, which is the minimum distance from the ridge of the core part to the corresponding ridge of the cavity part, of the production mold of the product, is significantly shorter than the predominant adjacent wall thickness 411. The angle of the pitch 405 from the first isthmus 403 to the second isthmus 404 is larger than arcus tangent 406 of the basic horizontally measured predominant wall thickness 411, between the isthmuses 403 and 404 divided by the stacking height 408 of the molded product. Between the isthmuses are a number of protruding ridges spaced as shown in FIG. 2C and 407, 412 spaced ridges leading from isthmus to isthmus 404, 403, etc. A part of the spaced ridges 407 project towards the center axis of the molded product 401, 402 and another part of the spaced ridges 412 projects away from the center axis of the molded product 401, 402. The molded product 401, 402 and therefore also its production mold comprise a number of circumferential ridges which are separated by a distance which is approximately equal to two times the stacking height 408 of the molded product 401, 402.

While the above description contains many specificities, these should not be construed as limitations on the scope of the invention, but rather as an exemplification of one preferred embodiment thereof. Many other variations are possible, for example molds which have no flow channels or molds for producing products with a square circumference, or products with rounded cross-sectionally shaped sides. Accordingly, the scope of the invention should be determined not by the embodiments illustrated, but by the appended claims and their legal equivalents.

I claim:

1. A molded thin-walled hollow, stackable plastic product, having an open top, a closed bottom and side walls;
    wherein the side walls include a series of circumferential strips, with the upper of two adjacent wall sections having a minimum diameter greater than a maximum diameter of the lowe adjacent wall section to thereby define a circumferential ridge at the bottom of each upper wall section;
    wherein the circumferential strip joining a pair of said upper and lower wall sections is a circumferential isthmus having an isthmus distance which is the minimum thickness of said strip defining the isthmus, that is significantly shorter than the predominant thickness of the adjacent wall sections; and
    wherein said isthmus is aligned at an acute angle with respect to each of the wall sections joined by said isthmus, with the juncture of the isthmus and the upper wall section being closer to the bottom of the product than the juncture of the isthmus and the lower wall section.

2. A product according to claim 1, wherein the wall sections include a plurality of spaced protruding ridges extending between adjacent circumferential strips.

3. A product according to claim 2, wherein the spaced protruding ridges radially protrude from one wall section in one direction and radially protrude from a wall section adjacent thereto in the opposite direction.

4. A product according to claim 1, wherein the side wall includes a plurality of said circumferential strips that are said circumferential isthmuses and join said circumferential side wall sections.

5. A product according to claim 4, wherein alternate circumferential strips are said circumferential isthmuses.

6. A product according to claim 4, wherein the wall sections include a plurality of spaced protruding ridges extending between adjacent circumferential strips.

7. A product according to claim 4, wherein the isthmus distance is shorter in the circumferential isthmuses that are nearer to the bottom.

* * * * *